United States Patent
Chevereau

[11] Patent Number: 5,106,572
[45] Date of Patent: Apr. 21, 1992

[54] CENTERING AND FIXATION DEVICE FOR A CLUSTER GUIDE FLANGE OF A CORE PLATE OF A NUCLEAR REACTOR

[75] Inventor: Gérard Chevereau, Le Raincy, France

[73] Assignee: Framatome, Paris, France

[21] Appl. No.: 417,092

[22] Filed: Oct. 4, 1989

[30] Foreign Application Priority Data

Oct. 4, 1988 [FR] France ............................ 88 12975

[51] Int. Cl.$^5$ ............................................. G21C 1/04
[52] U.S. Cl. ................................. 376/353; 376/285; 376/233; 376/234
[58] Field of Search ............... 376/233, 234, 239, 290, 376/285, 353; 429/208.2, 208.4; 220/378

[56] References Cited

U.S. PATENT DOCUMENTS

| | | | |
|---|---|---|---|
| 4,050,988 | 9/1977 | Lemercier | 376/290 |
| 4,173,513 | 11/1979 | Obermeyer et al. | 376/353 |
| 4,369,893 | 1/1983 | Pennell et al. | 220/378 |
| 4,752,434 | 6/1988 | Savary | 376/233 |
| 4,752,438 | 6/1988 | Desfontaines et al. | 376/285 |
| 4,842,813 | 6/1989 | Desfontaines et al. | 376/353 |

Primary Examiner—Donald P. Walsh
Assistant Examiner—Meena Chelliah
Attorney, Agent, or Firm—Pollock, Vande Sande & Priddy

[57] ABSTRACT

A device for the centering and fixation of a cluster guide flange and of a core plate of a nuclear reactor, extending parallel to one another in horizontal planes with a predetermined spacing. The device includes at least two axial guiding spindles of flange with respect to the core plate, diametrically opposite and rigidly connected to the plate or to the flange in order to engage into a housing in register formed in the flange or in the plate, respectively, and an assembly of self-locking shoes, adapted for sliding with a clearance within bores formed in the flange in order to be pressed on the plate surface, these shoes being each associated with a position control mechanism, carried by the flange and exerting on the shoes a force having a transverse component so as to cause, by reaction, immobilization of the flange with respect to the plate.

9 Claims, 3 Drawing Sheets

CENTERING AND FIXATION DEVICE FOR A CLUSTER GUIDE FLANGE OF A CORE PLATE OF A NUCLEAR REACTOR

FIELD OF THE INVENTION

The present invention relates to a connection device for the centering and fixation of the upper core plate which closes the core cavity of a nuclear reactor, particularly of a PWR reactor, and a flange extending above said plate and on which are secured against movement the ends of guide tubes in which move cluster assemblies of neutron absorbing rods, adapted to be inserted in the core between the nuclear fuel elements, for ensuring the regulation of the fission reaction.

More particularly, the invention relates to a device allowing relative positioning of two horizontal parallel plates by providing for perfect alignment of passages extending through them for the engagement or retraction in the core of the absorbing rod clusters, by eliminating any risk of jamming or blockage of said clusters during their movements, while allowing a slight relative axial displacement.

BACKGROUND OF THE INVENTION

In the prior art, the connection and accurate positioning of these two members is provided by means of spindles, one of the ends of which extends into an appropriate housing of the core plate by being axially slit in order to impart to it a relative resiliency in the transverse direction, the other end extending with a clearance through a bore of the flange of a cluster guide and being secured against movement with respect to the latter by screwing a nut coming in abutment against an inner shoulder of the bore so as to exert a reaction during the screwing on a threaded portion of the spindle. The nut is thereafter blocked on the flange, e.g., by soldering. By distributing over the flange periphery an appropriate number of such spindles and by providing for their coordinated tightening via the nuts associated thereto, accurate positioning of the flange with respect to the plate is achieved, notably so as to bring into alignment the vertical axes of these two members and to adjust to an accurately determined value the horizontal clearance between them.

The axially slit end is formed of two flexible branches the outer diameter of which is slightly greater than the receiving bore, formed in the upper plate of the core, assuring sure that after mounting there is no remaining clearance subject to vibrations and wear, and providing an adaptation to the position tolerances of the two spindle axes respectively on the core upper plate and on the cluster guide lower flange.

The two spindles are generally disposed in such manner that the slits are positioned perpendicularly with respect to one another.

This state affords the best compromise between strength and flexibility. However, the centering of the two parallel members takes place against the resisting section of the spindles, which must provide not only for the orientation and coincidence of the cluster guides with respect to the network of fuel elements underneath the core plate, but also for the holding of the lower ends of these guides, while opposing the vibrations, which are sometimes significant, created by the hydromechanic stresses resulting from the axial flow of the cooling water flowing through the plate and flange and which is collected above said plate in the upper portion of the reactor vessel, and then is discharged through appropriate outlet nozzles. The prior art solutions only partly meet these requirements, and cannot provide assurance of reliability over time.

SUMMARY OF THE INVENTION

The object of the present invention is a device mitigating the disadvantages of the standard solutions by allowing dissociation of the two functions which consist respectively in centering the flange with respect to a common axial reference, and relative fixing of the two members by providing between them a spacing which is always uniform whatever the operational speeds of the reactor and resulting stresses on the cluster guides and their connections with the plate.

To this effect, the device includes at least two axial guiding spindles of the flange with respect to the core plate, diametrically opposite and rigidly fixed to the plate or to the flange in order to extend in a housing in alignment formed in the flange or in the plate respectively, and an assembly of self-locking shoes, adapted for sliding with a clearance in bores formed in the flange in order to apply against the plate surface, said shoes being each associated with a position control mechanism, carried by the flange and exerting on the shoes a force having a transverse component so as to provide by reaction the immobilization of the flange with respect to the plate.

Thanks to these dispositions, the spindles ensure on the one hand the guiding in axial translation of the flange with respect to the upper core plate, save the mounting clearances of these spindles in their housings. Simultaneously, lateral self-locking shoes provide for the and axial retention of the flange with respect to the plate, the locking mechanism associated with each of said shoes allowing adjustment of their relative positioning in the bores of the flange, and therefore positioning of the latter, independently of the dimensional variations to which they may be subjected during the reactor operation, their structure being such that they readily absorb the effects of the vibrations created by the cooling water flow from the core through the plate and flange.

According to a particular feature of the invention, the self-locking shoes have a general cylindrical shape and include a plane bearing face, applied against the core plate, and an opposite face slanting with respect to the horizontal. The control mechanism cooperating with each shoe is preferably made of a push-piece extending into a bore of the flange and including a convex face, bearing on the slanting face of the shoe, said push-piece being prolonged outside the flange bore at the end opposite to the plate by an elongated rod, located on the axis of a sleeve with an inner screw thread at its end for screwing a hollow calibration bushing, through which the rod extends freely and exerts a vertical force on the latter via a spring cartridge, bearing on the one hand against the bushing and on the other hand against a washer through which extends the rod, and in abutment on a shoulder of the latter.

Advantageously, the spring cartridge includes a pack of conical washers mounted between the washer bearing against the rod shoulder and a complementary washer, sliding freely inside the sleeve, parallel to the rod axis, under the effect of the bushing being screwed on the sleeve inner thread. The spring cartridge thus permanently exerts on the shoe a force which is adjusted and develops a friction force between the plate and the shoe which opposes lateral displacement of the flange with respect to the plate in a selected direction. The arrangement of several shoes on the same flange cooperates for opposing any lateral displacement in any direction, while allowing the effects of any accidental vibrations to be absorbed, the flange resuming its its predetermined position with respect to the plate once these vibrations have disappeared or have been eliminated.

According to another feature of the invention, the threaded sleeve includes, in its lower end, a hollow end-piece through which extends the stem and the end of which is in part inserted in the flange bore and then is secured against movement in position with respect to the flange, e.g. by soldering.

According to still another feature, the elongated rod has, at its upper end extending beyond the calibration bushing, a transverse slit identifying its axial orientation and therefore that of the convex face of the push-piece with respect to the flange axis and allowing, by reaction on the shoe slanting face, relative adjustment of the push-piece and therefore of the flange connected thereto with respect to the core plate.

Advantageously, each shoe has a configuration in the shape of a clevis, the two parallel sides of which are disposed on either side a plane central rib extending the push-piece downwardly, the clevis and the rib being connected by a transverse peg carried by the clevis sides and engaged with clearance in a hole of the rib so as to allow axial and radial movement of the push-piece with respect to the shoe when the flange bears on the plate. The mounting of the shoe and the push-piece thus formed allows making these two elements captive by connecting them to one another via a connection with a clearance which does not impede the relative displacement of these members for the flange centering and immobilization when the convex face of the push-piece bears against the shoe slanting face.

The shoe can usefully carry a surface coating, such that the face of this shoe which is in contact with the core plate has a high coefficient of friction. On the contrary, the push-piece, the inner surface of the flange bore receiving the shoe, as well as the respective slanting and convex faces of the shoe and the push-piece, respectively carry a surface coating with a reduced coefficient of friction, facilitating the relative displacement of these parts. Advantageously, this coating can be made of chromium and "Stellite" or any similar material, conventional in the art and adapted to the operating conditions in the reactor vessel.

BRIEF DESCRIPTION OF THE DRAWINGS

Other features of the centering and fixation device of a cluster guide flange with respect to a core plate of a nuclear reactor will become more apparent from the hereafter description of several embodiments thereof, given by way of example and with reference to the accompanying drawings.

DESCRIPTION OF PREFERRED EMBODIMENT

Figure 1:
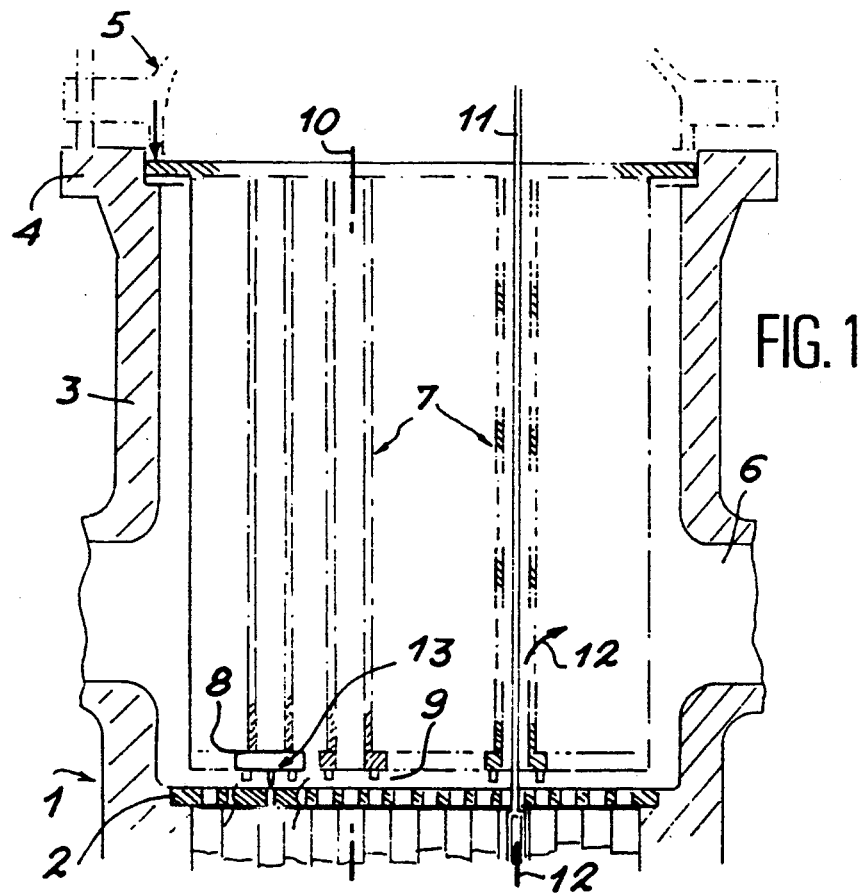
FIG. 1 is a partial transverse sectional schematic view of the upper portion of the vessel of a nuclear reactor with pressurized water, showing in particular the relative positioning of the cluster guide flanges with respect to the upper core plate.

FIG. 1 shows schematically the vessel 1 of a pressurized water nuclear reactor with including above the core (not shown) a closing plate, called core upper plate 2, placed horizontally. Vessel 1 extends above plate 2 via an enclosure 3 terminating in a flange 4 on which a cover 5 is placed and latched. Nozzles 6 of large diameter are provided in the side wall of enclosure 3 for the outflow of the core cooling water.

In enclosure 3, a guide assembly 7 is mounted above the upper core plate, each guide being provided at its lower portion with a circular guide flange 8 adapted for bearing on plate 2 while forming with it a narrow transverse clearance 9. Guides 7 extend with their vertical axes 10 perpendicular to plate 2 and are provided for supporting clusters of absorbant rods (not shown in detail), the extent of whose insertion inside the reactor core through plate 2 via an operating member 11 permits the nuclear reaction to be controlled. In FIG. 1, reference 12 denotes schematically the circulation direction of the cooling water which, flowing from bottom to top, flows through the upper plate 2 prior to being discharged outside the guides 7 and then from enclosure 9 through nozzles 6.

In a conventional construction of the above type, the accurate positioning of the flanges 8 of the guides 7 for the absorbing clusters with respect to the upper core plate 2 is, whereby each guide has to notably positioned perfectly with respect to a corresponding opening of plate 2 for the passage of the absorbing rods. Simultaneously, the transverse dimension of clearance 9 between plate and flange must be rigorously determined, irrespective of the vibrations created by the flow of cooling water and by the hydrodynamic stresses exerted on the connection means which are used. In particular, the assembly formed by the core plate 2 and the flanges 8 which are above it must be such that possible excessive forces can be absorbed by subsequent return of the two parts to their optimal and predetermined relative positions, and this without prejudice to the mechanical structures used.

To this effect and according to the invention, each flange 8 of any guide 7 is positioned with respect to the core plate 2 by means of two diametrically opposite massive spindles 13 and 14 (FIG. 2), these spindles being implanted in the thickness of the flange while protruding outside said flange in the direction of plate 2 and extending inside housings 15 and 16 provided in register in plate 2 with a convenient mounting clearance 17. In a particular embodiment of the invention, spindles 13 and 14 emerge from the lower face of each flange 8 along a height which is sufficient for to permit precise positioning of guide 7 connected to this flange with respect to core plate 2, of the order of about 0.5 mm. These spindles 13 and 14 extend into their housings 15 and 16 with a diametrical clearance 17 which in practice is about 0.3 to 0.4 mm.

Figure 2:
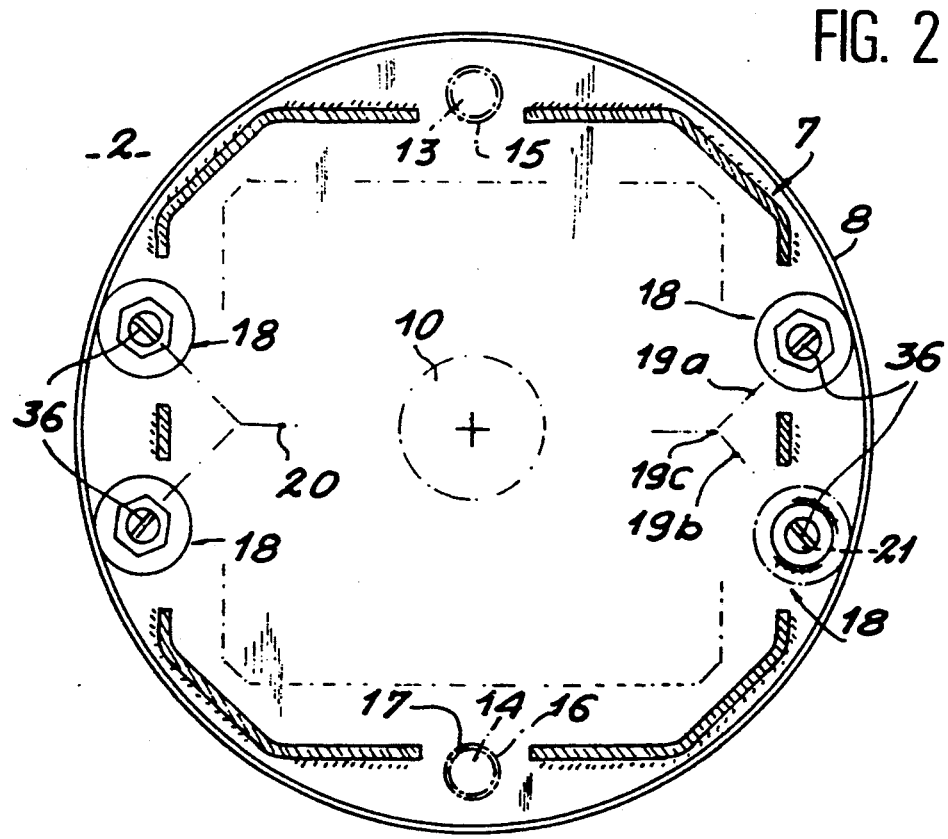
FIG. 2 is a top plan view on a larger scale of a cluster guide flange.

The two positioning spindles 13 and 14 are associated with an assembly of four self-locking shoes 18, placed as shown in FIG. 2. These shoes are so designed that, as will be seen hereafter, they can exert on flange 8 suitably distributed forces, while allowing in combination with the centering obtained by spindles 13 and 14 the indispensable precise positioning and the permanent alignment of the vertical axes of the passages reserved for the absorbing clusters.

Preferably, the four self-locking shoes 18 are distributed by pairs, two on either side of the diametrical plane connecting spindles 13 and 14, the shoes of the same pair exerting on flange 8 forces which are respectively in directions 19a and 19b, converging at a point 19c situated on the transverse axis perpendicular to the direction of the plane connecting spindles 13 and 14. The conjunction of the forces of the four shoes 18 and of spindles 13 and 14 allows them to resist displacement of the cluster guide with respect to upper core plate 2 without permanent and fluctuating dragging effects, thereby ensuring the desired centering of axis 10 of guide 7 connected to flange 8, in alignment with that of the passage (not shown) formed in plate 2 underneath flange 8, through which the cluster of absorbing rods will be more or less permanently inserted in the core underneath the plate, for control of the nuclear reactivity.

Figure 3:
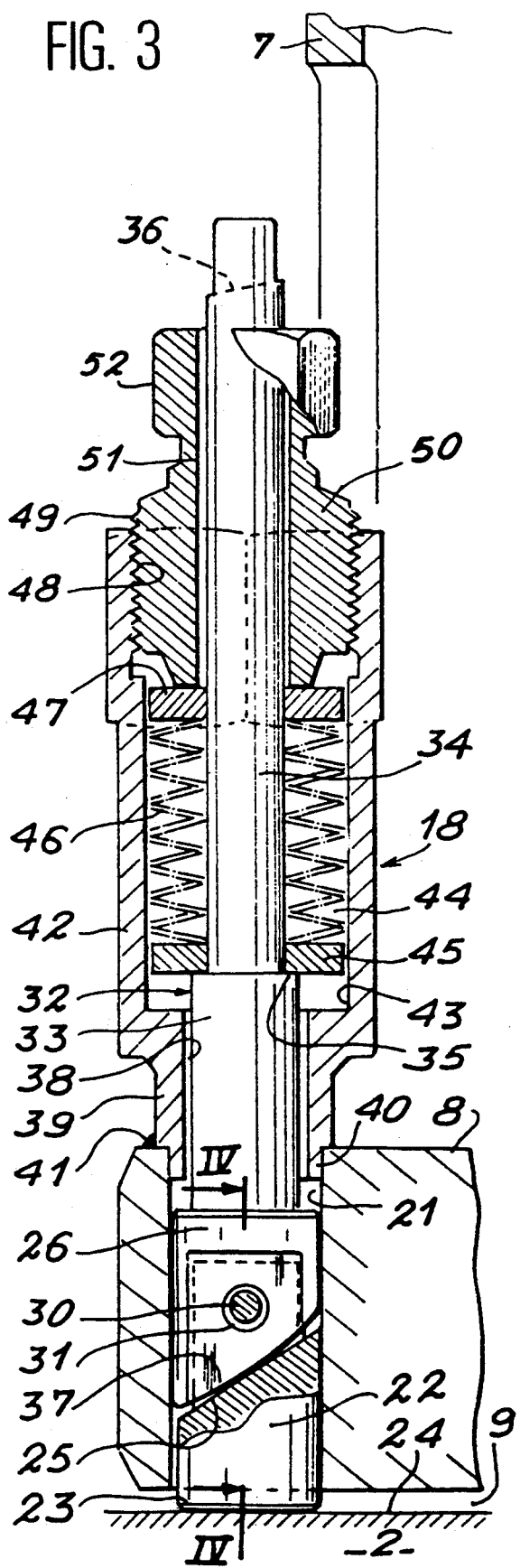
FIG. 3 is an axial section view on a still larger scale of a self-locking shoe and its control mechanism.
Figure 4:
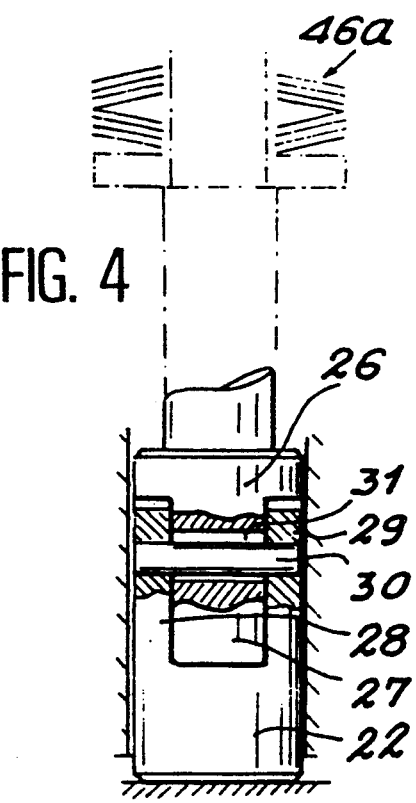
FIG. 4 is a partial transverse sectional view along line IV—IV of FIG. 3.

FIGS. 3 and 4 show a particular embodiment of the self-locking shoe 18 and of the control mechanism associated therewith.

This assembly includes a block or shoe 22 as such, mounted with a clearance in a transverse bore 21 formed in flange 8, said shoe 22 having a plane lower face 23 in contact with the upper surface 24 of the core plate 2. Shoe 22 protrudes slightly underneath flange 8 over a height corresponding to the clearance 9 provided between plate 2 and flange 8.

At its end which is opposite face 23, shoe 22 has a slanting face 25 for cooperating with a push-piece 26, also mounted with a clearance in bore 21.

Shoe 22 and push-piece 26 are connected to one another through a non-rigid connection, permitting their relative axial displacement while also permitting the shoe to be suspended underneath the push-piece, rendering it captive. To this effect, the push-piece is extended downwardly by a flat central rib 27, engaging between the two parallel sides 28 and 29 of a clevis (FIG. 4) formed in the corresponding upper portion of the shoe, the connection between rib 22 and sides 28 and 29 of the clevis being provided by a transverse peg 30, extending through a cylindrical hole 31 of larger diameter formed in rib 27.

Push-piece 26 is extended upwardly, particularly toward the upper portion of transverse bore 21, by a narrower stem 32, extending over a distance outside this bore, the stem 32 including two successive axial portions 33 and 34 of different diameters, portion 33 having a diameter larger than that of portion 34 so as to form a shoulder 35 at the junction of the two portions. At its upper end opposite shoulder 35, stem 32 is formed with a slit 36 allowing the relative orientation of the stem with respect to the vertical to be indentified and, the direction of the force exerted by push-piece 26 on stem 22 by the cooperation of the respective surfaces of the two elements mutually bearing on one another to be varied. To this effect and in order to allow an orientation of the resultant force created on shoe 22, push-piece 26 is formed at its lower end with a convex face 37, substantially as a portion of cylinder, and adapted to come to bear against the slanting surface 25 of the shoe, the application of these surfaces on one another producing a resultant of the forces created, particularly for the four associated shoes of the same spindle, according to directions 19a and 19b of FIG. 2.

Portion 33 of stem 32 extends with a clearance through an axial passage 38, formed in an end-piece 39 the lower end 40 of which engages over a short distance inside bore 21 of flange 8, the end-piece being then secured against movement with respect to the flange, e.g., by a weld 41. End-piece 39 is extended upwardly by a sleeve 42, defining a chamber 43 in which is also mounted, with a clearance, a spring cartridge 44, including a lower support washer 45 through which extends the smalles diameter portion 34 of stem 32 and which bears at the base of this lower portion on shoulder 35. A pack of conical washers 46 is disposed about portion 34, these washers being thus contained between the lower ring 45 and a complementary washer 47. A variable force can be exerted on the spring cartridge 44, and due to the abutment of washer 45 on shoulder 35, on stem 32 and thense on push-piece 36. To this effect, sleeve 42 is formed with an interior screw thread 48, cooperating with a screw thread 49 having the same pitch 49 formed on the outer surface of a calibration bushing 50. The latter is formed with an axial bore 51 through which extends with a clearance the portion 34 of stem 32, and which includes at its upper end a head nut 52 allowing control of the rotation of the bushing in the sleeve screw thread, by exerting on spring cartridge 44 the required force, of the order of 1000N per shoe.

The structure of the spring cartridge may be varied, for example by using, as shown schematically in FIG. 4, double washers 46a or other means allowing an elastic transmission of the efforts of the bushing toward the push-piece while ensuring, in the case of a force in the opposite direction, the absorption of the latter by simple compression of the washer pack between washer 47 which remains immobile and washer 45 which is subjected to a telescoping movement within sleeve 42 and which follows the corresponding limited displacement of stem 32.

Shoes 22 carry an appropriate surface coating, which is preferably different for the plane lower face 23 and for the slanting upper face 25 of these shoes. Notably, the surface coating of face 23 is chosen in such manner that it imparts to the surface 24 of upper plate 2 a coefficient of friction which is the highest possible. On the contrary, the coating of convex face 37 of face 25, as well as that of push-piece 26, is chosen with a coefficient which is as small as possible in order to facilitate sliding motion of the respective faces on one another. Preferably also, the outer surfaces of shoe 22 and of push-piece 26, as well as the inner surface of bore 21, carry a surface coating similar to that of faces 25 and 37 for facilitating in the same manner their relative sliding motion when the device is used.

The operation of the centering and fixation device according to the invention is the following: Flange 8 with its two fixed spindles 13 and 14 (FIG. 2) is positioned on the upper plate 2 with a clearance in their positioning which corresponds to the clearance 17 of these spindles in their respective housings 15 and 16.

After mouthing of the spindles and self-locking shoes on the flange of the cluster guides, the spring cartridges are calibrated, and the cluster guides are then mounted on the support structure above the upper core plate.

After mounting of the two fixed spindles 13 and 14 on flange 8, one disposes on end-piece 39 the push-piece 32, the washer 45, the spring cartridge 44, the washer 47, the calibration sleeve 50 (without tightening it), the shoe 22 on push-piece 32, and its axis 30. The four end-pieces thus fitted out are positioned on flange 8 and attached, e.g., by soldering.

Underneath flange 8 is fixed a wedge of a thickness corresponding to the predetermined space 9, then the tightening is carried out with the assistance of a calibration sleeve 50 of spring cartridge 44 to a predetermined value, taking into account the relaxation of the service elements, the calibration tolerances, the variations of clearance 9, so that the force exerted by the push-piece on the shoes always remains greater than to a calculated value, i.e., about 600N. The tightening of the calibration sleeve is carried out by one of the conventional methods for obtaining a preload: either a torque or an angular stroke after being in contact, or a force cell placed underneath the shoe, or a combination of these methods.

The shoes 23 and the push-pieces 32 are oriented with the assistance of slit 36 according to directions 19a and 19b, and then the rotation of calibration nut 32 is braked. The setting plate is then removed, to release the preload of the spring cartridges.

The cluster guides are then mounted on the support structure; This positions flanges 8 above the core plate 2. About 20 mm prior to reaching clearance 9, the fixed spindles 13, 14 engage into the respective housing 15 and 16 with a small clearance 17, thereby ensuring a correct orientation of the cluster guide on the upper core plate 2. About 5 mm prior to reaching clearance 9, face 23 of the shoes comes in contact with the core plate 2, the shoes push back push-pieces 32 upwardly, and the latter compress the spring cartridges to the preestablished mounting value.

The four shoes 18 are controlled so that the resultant of the forces exerted on these shoes taken two by two, as is also shown in FIG. 2, converges at points symmetrical to one another in a median diametrical plane, perpendicular to that which joins spindles 13 and 14. To this effect, shoes 22, the lower plane faces 23 of which are in contact with surface 24 of plate 2, are subjected by the calibration bushings 50 to an appropriate force in the direction of the plate, stems 32 being previously oriented by their slit 36 in the desired direction. The screwing of bushings 50 is pursued until, due to the lateral displacement of shoes 22 created by the cooperation of the convex face 37 of push-piece 26 with the slanting face 25 of the corresponding shoe, the initially defined diametrical clearance between the shoe and its bore is adjusted, the resilient washers 46 of cartridge 44 being compressed within the corresponding limit.

In this position, flange 8 is perfectly positioned with respect to the upper core plate 2, while leaving between these members only the clearance 9 which is necessary for the differential expansion of flange 8 and of the structures connected thereto.

The calibration of spring cartridge 44 takes into account the relaxation of the elements in service and the calibration tolerances, so that the force exerted by the push-piece on the self-locking shoes remains substantially uniform, even when clearance 9 varies during the thermal cycles resulting from the operation of the reactor and of the differential expansions resulting therefrom. This axial force, multiplied by the coefficient of friction between the shoes 22 and the upper core plate 2, thus creates a lateral component opposing the transverse displacement of flang 8 under the effect of the hydrodynamic stresses of which these members are the seat, particularly due to the flow of cooling water through them.

Figure 5:
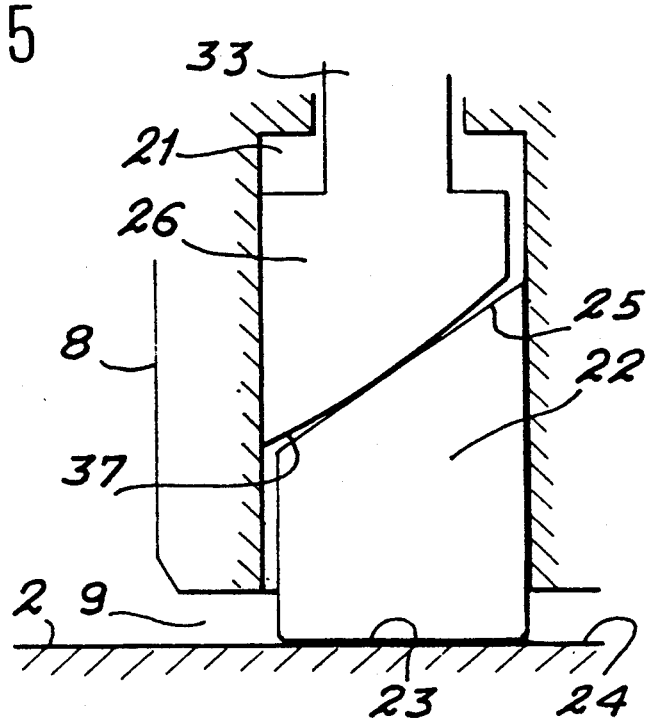
FIGS. 5 and 6 are schematic views to illustrate the operation of the device as regards relative displacement of the self-locking shoes with respect to the push-piece of the associated control mechanism.
Figure 6:
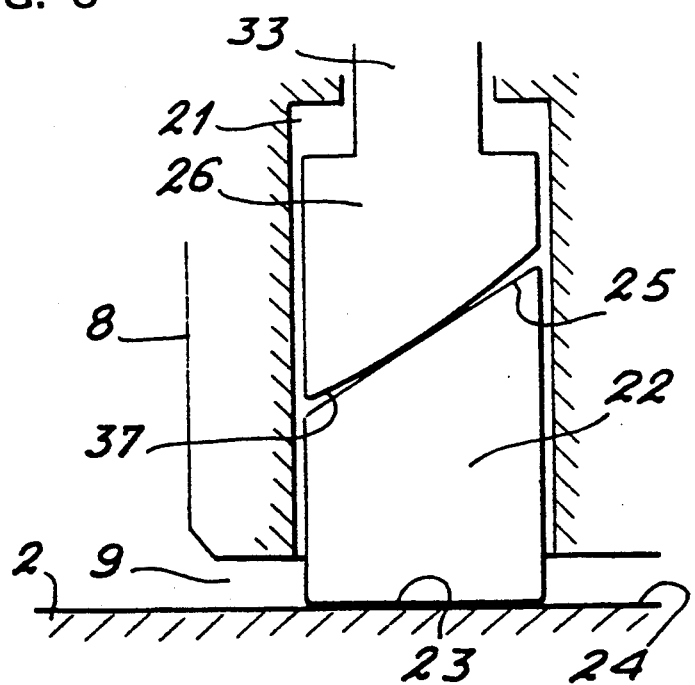

The respective positions of the shoe and of the push-piece change from those of FIG. 6 to those of FIG. 5, due to the inclination of the bearing faces 25 and 37, the effect of which is to cancel the clearance of shoe 22 and of its housing within flange 8.

Figure 7:
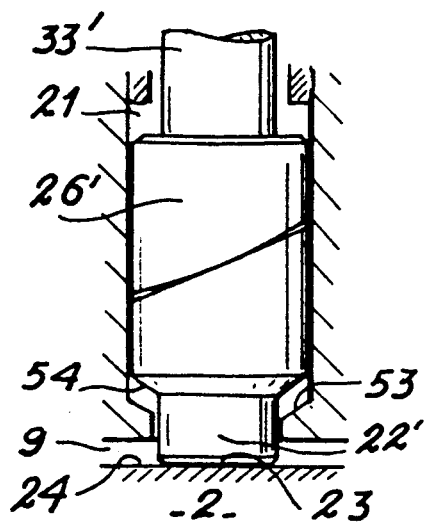
FIG. 7 shows another embodiment of the self-locking shoes and of the push-pieces acting on them.

The invention is not limited to the embodiment more especially described and shown hereabove. In particular and as is shown in FIG. 7, the mounting in two portions of shoe 22 and of push-piece 26 connected via their transverse peg 30 can be replaced by another embodiment shown schematically in FIG. 7, where the lower end of portion 33' of the stem again includes a push-piece 26' acting on the shoe 22' bearing on surface 24 of plate 2, but in which the shoe is made captive due to a retracted bearing surface 53 formed in the bottom of the flange and against which bears, notably in the flange transportation position, a collar having the same profile 54 as said shoe.

I claim:

1. A device for the centering and fixation of a cluster guide flange of a core plate of a nuclear reactor, extending parallel to one another in horizontal planes with a predetermined spacing, including at least two axial spindles for guiding said flange with respect to said core plate, said spindles being diametrically opposite and rigidly connected to said core plate or to said flange in order to engage in a housing in alignment formed in said flange or in said core plate respectively, and an assembly of generally cylindrical self-locking shoes having a first, planar face applied against said core plate and a second, opposite face which is inclined to the horizontal, said shoes being adapted for sliding with a clearance within bores formed in said flange in order to be pressed against a surface of said core plate, said shoes being each associated with a position control mechanism, carried by said flange and exerting on the shoes a force having a transverse component which is predetermined so as to oppose lateral displacement of said flange with respect to said core plate and to eliminate lateral play between said shoe and said flange.

2. A device according to claim 1, wherein said control mechanism associated with each shoe is constituted by a push-piece engaged in a bore of said shoe and having a convex face bearing on said inclined face of the shoe, said push-piece being extended beyond a bore in said flange on the side opposite said core plate by an elongated stem extending along an axis of a sleeve and having an inner screw thread at an end of said sleeve for screwing on a hollow calibration bushing through which said stem extends freely and exerts a vertical force on said stem via a spring cartridge having a first end bearing against said bushing and a second end bearing on a washer through which said stem extends and which is in abutment against a shoulder of said stem.

3. A device according to claim 2, wherein said spring cartridge comprise a stack of conical washers mounted between said washer and a complementary washer freely sliding inside the sleeve, parallel to the stem axis, under the effect of screwing of said bushing on said inner screw thread of said sleeve.

4. A device according to claim 2 or 3, wherein said threaded sleeve includes at its lower end a hollow endpiece through which extends said stem and an end of which engages in part in said bore of said flange and is then secured against movement in position with respect to said flange by securing means.

5. A device according to claim 2, wherein said elongated steam is provided at an upper end of said stem which extends beyond said calibration bushing with a transverse slit for identifying an axial orientation of said stem and therefore an axial orientation of said convex face of said push-piece with respect to the axis of said flange, and enabling by reaction on said inclined face of said shoe, relative adjustment of said push-piece and therefore of said flange connected therewith with respect to said core plate.

6. A device according to claim 1, wherein each shoe has a configuration of a clevis having two parallel arms disposed on either side of a central plane rib extending said push-piece downwardly, said clevis and said rib being connected by a transverse peg carried by said arms of said clevis and engaging with clearance in a hole of said rib so as to permit axial and radial displacement of said push-piece with respect to said shoe when there is a blockage of said flange with respect to said core plate.

7. A device according to claim 1, wherein each shoe includes a retracted stepped collar cooperating with a bearing surface of a same profile formed in a bottom of said bore of said flange.

8. A device according to claim 1, wherein said shoe has a first surface coating providing a face of said shoe which is in contact with said core plate with a coefficient of friction higher than a coefficient of friction provided by a second surface coating carried by said push-piece, the inner surface of said bore of said flange receiving said shoe, as well as said inclined face and said convex face of said shoe and of said push-piece.

9. A device according to claim 8, wherein said first coating is of "Stellite" and said second coating is chromium.

* * * * *